United States Patent [19]

Törmälä et al.70 [45]

[11] Patent Number: 4,829,097

Date of Patent: May 9, 1989

[54] PROCESS FOR THE PREPARATION OF AN ISOCYANURATE MODIFIED POLYURETHANE FOAM AND THE RESULTING FOAM

[75] Inventors: Pertti Törmälä; Timo Pohjonen, both of Tampere; Aimo Ihanamäki; Eero Jormalainen, both of Kankaanpää; Kauko Linna, Helsinki, all of Finland

[73] Assignee: Oy Lohja Ab, Helsinki, Finland

[21] Appl. No.: 6,974

[22] Filed: Jan. 22, 1987

[30] Foreign Application Priority Data

Jan. 22, 1986 [FI] Finland ................................. 860302

[51] Int. Cl.$^4$ ................................................. C08K 9/00
[52] U.S. Cl. .................................. 521/109.1; 521/902; 521/123; 521/130
[58] Field of Search ...................... 521/902, 109.1, 123, 521/130

[56] References Cited

U.S. PATENT DOCUMENTS

| | | | |
|---|---|---|---|
| 3,051,601 | 8/1962 | Schick | 521/109.1 |
| 3,211,674 | 10/1965 | Sandridge | 260/97.5 |
| 3,248,348 | 4/1966 | Piechota et al. | 540/482 |
| 3,423,339 | 1/1969 | Andrews et al. | 521/116 |
| 3,637,540 | 1/1972 | Rugmarken et al. | 521/167 |
| 3,860,565 | 1/1975 | Barber, Jr. | 528/57 |
| 4,271,273 | 6/1981 | Biranowski et al. | 521/902 |
| 4,359,550 | 11/1982 | Narayan et al. | 521/902 |
| 4,374,204 | 2/1983 | Alexandrov et al. | 521/109.1 |
| 4,405,725 | 9/1983 | Bernard et al. | 521/112 |
| 4,521,544 | 6/1985 | Kennedy | 521/110 |

FOREIGN PATENT DOCUMENTS

| | | |
|---|---|---|
| 49727 | 6/1975 | Finland . |
| 58503 | 10/1980 | Finland . |
| 1170079 | 11/1969 | United Kingdom . |
| 1390231 | 4/1975 | United Kingdom . |
| 1405434 | 9/1975 | United Kingdom . |
| 1471842 | 4/1977 | United Kingdom . |

OTHER PUBLICATIONS

F. A. Coglianese, J. Cell. Plast., Jan., 1965.
A. Hase, Kemia-Kemi No. 1-2, 1978, (not translated).
E. K. Moss et al., J. Cell. Plast., Nov./Dec. 1976.
E. K. Moss et al., J. Cell. Plast., Jul./Aug. 1978.
I. S. Bechara et al., J. Cell. Plast., Nov./Dec. 1979.
K. Laughner et al., J. Cell. Plast., May/Jun., 1983.
Saunders and Frisch, Polyurethanes: Chemistry and Technology, Part 1, pp.161-173.

Primary Examiner—John Kight
Assistant Examiner—Dennis R. Daley
Attorney, Agent, or Firm—Dilworth & Barrese

[57] ABSTRACT

The invention relates to a process for the preparation of novel isocyanurate modified polyurethane foams, which process is characterized in that an organic polyisocyanate is reacted with a polyol in the presence of a catalyst system and a blowing agent, eventually in the presence of a filler material and/or an emulsifying agent, wherein said polyol contains 5 to 100% by weight of an oil, resin or a mixture of resins originating from soft wood and/or a chemically modified resin or oil, and wherein said polyol contains in its molecular structures hydroxl groups capable of reacting with isocyanate groups, and the catalyst system contains 5 to 95% by weight of trimerization catalyst of the polyisocyanate, which catalyst causes cross-linked polyisocyanurate structures containing isocyanurate rings to be formed from the polyisocyanate in the polymer structure, and to novel isocyanurate modified polyurethane foams prepared by the process.

15 Claims, No Drawings

PROCESS FOR THE PREPARATION OF AN ISOCYANURATE MODIFIED POLYURETHANE FOAM AND THE RESULTING FOAM

The invention relates to a process for the preparation of novel isocyanurate modified polyurethane foams and to novel isocyanurate modified polyurethane foams prepared by this process by the use of novel foamable mixtures of polyurethane raw materials. The invention is especially concerned with a process for the preparation of polyurethane foams at low manufacturing costs by the use of novel type of a mixture of raw materials for the preparation of a foamable polyurethane.

Polyurethane foams, that is, cellular polyurethanes are generally prepared by the exothermic reaction of a polyisocyanate and one or more polyols in the presence of a catalyst and a foaming or blowing agent.

As used herein, the term "polyol" refers to a compound containing a plurality of hydroxyl groups which are reactive with isocyanate groups to form urethane polymers. The polyisocyanates generally used are aromatic diisocyanates, such as toluene diisocyante (TDI) and polyaryl phenyl isocyanates. The polyols used in the reaction are generally resinous materials which have a plurality of reactive hydrogen atoms. These materials include hydroxyl-bearing resins, such as polyester and polyether resins, and naturally occurring hydroxyl-bearing oils, such as castor oil.

Catalysts are included in the reaction mixture in order to accelerate the foaming reaction and obtain a proper cure. Stannous octoate, dibutyl tin laurate, amines and acids are commonly used as catalysts in the preparation of polyurethane foams.

The foaming or blowing agents used to expand the polyurethane into a cellular structure, may be either by-products of the reaction, such as carbon dioxide, generated by the reaction of some of the isocyanates and water; or nitrogen, generated, for example, by the decomposition of an azide; or special liquids or solids intended for the expansion, such as chlorofluoromethanes, which are vaporized by the heat of reaction of by a reduction of pressure. The term "blowing agent" as used herein refers to any such suitable material used to produce this expansion.

Polyurethane foam is generally prepared by mixing the components of the mixture in a suitable manner and by allowing the mixture to be formed into a desired shape in a suitable space.

Polyurethane foam is known to possess many desirable properties and characteristics. For example, rigid polyurethane foam has the desirable characteristics of toughness, strength at low density, integrity, high thermal insulation value, chemical stability, and resistance to solvents.

Consequently, rigid polyurethane foam is well-suited for many commercial applications, such as fog thermal insulation, for construction and building material applications, in packaging, and the like. Despite the many known desirable properties of polyurethane foam, it has nevertheless met with commercial resistance due to its relatively high cost, which makes the use of the foam economically unfeasible for many applications. Thus, high raw material costs have retarded the growth of the rigid polyurethane foam industry.

The use of material originating from wood as a component in urethane foams for reducing the manufacturing costs has been described in several patent specifications and researches.

British Patent Specification No. 1,170,079 discloses a process for the preparation of polyurethane foam by reacting an organic polyisocyanate with a polyol in the presence of a catalyst and a foaming agent, the polyol containing hydroxyl groups reactive with isocyanate groups, wherein said polyol contains as a component 5 to 100% of a reaction product of an alkylene oxide and a tall wood resin substantially insoluble in alifatic hydrocarbons and containing plenty of phenolic compounds. The tall resin used in the process according to said British Patent Specification is prepared by distilling pyrolytically tall wood or the like (see U.S. Pat. Nos. 2,193,026 and 2,221,540).

U.S. Pat. No. 3,211,674 discloses a rigid polyurethane foam which is prepared by reacting an organic polyisocyanate with a hydroxylated tall oil in the presence of a foaming agent.

However, the use of materials originating from wood as a component in urethane foams has often resulted in the deteriotation of the properties of the product, e.g. reduced dimensional stability and formation of an open cellular structure (F.A. Coglianese J. Cell. Plast., January, 1965, p. 42). In addition, materials originating from wood often react more slowly than synthetic polyols and polyisocyanates which further deteriorates the properties of the product and hampers the processing.

It has now been unexpectedly found that the above difficulties, occurring in connection with the use of materials originating from wood, such as tall oil, tall resin (or a mixture of resins) or chemical modifications thereof, as a component in polyurethanes, can be eliminated by the use of a trimerization catalyst of polyisocyanate as a component in the catalyst system of the polymerization, which trimerization catalyst causes crosslinked polyisocyanurate structures containing isocyanurate rings to be formed from the isocyanate:

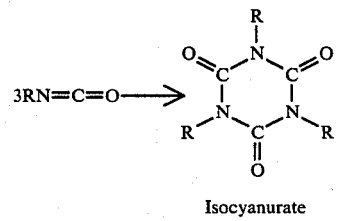

Isocyanurate

The use of trimerization catalyst has many advantageous effects on the structure of polyurethane foam and the processing. The isocyanurate rings stiffen the polyurethane network, with the result that the dimensional stability and the mechanical properties of polyurethane containing materials originating from wood as a component are improved. In addition, the trimerization catalyst accelerates the curing reaction of the foam, so that even a raw material mixture containing slowly reacting components originating from wood can be foamed on conventional processing lines intended for the production of foamed polyurethane.

The process according to the invention for the preparation of isocyanurate modified polyurethane foams is characterized in that an organic polyisocyanate is reacted with a polyol in the presence of a catalyst system and a blowing agent, eventually in the presence of a filler material and/or an emulsifying agent, wherein said polyol contains 5 to 100% by weight of an oil, resin or a mixture of resins originating from soft wood and/or a chemically modified resin or oil, and wherein said polyol contains in its molecular structures hydroxyl groups capable of reacting with isocyanate groups, and and the catalyst system contains 5 to 95% by weight of a trimerization catalyst of the polyisocyanate, which catalyst causes cross-linked polyisocyanurate structures containing isocyanurate rings to be formed from the polyisocyanate in the polymer structure.

In the preparation of isocyanurate modified polyurethane foam according to the invention by means of the process according to the invention, any suitable organic polyisocyanate may be used as a polyisocyanate, including aromatic, aliphatic and heterocyclic polyisocyanates. In other words, two or more isocyanate radicals may be bonded to any suitable divalent or higher polyvalent organic radical to produce the organic polyisocyanates which are useful in accordance with the present invention. Such radicals include acyclic, alicyclic, aromatic and heterocyclic radical. Suitable organic polyisocyanates are, therefore, ethylene diisocyanate, ethylidene diisocyanate, propylene-1,2-diisocyanate, cyclohexylene-1,2-diisocyanate, m-phenylene diisocyanate, 2,4-toluylene diisocyanate, 2,6-toluylene diisocyanate, 3,3'-dimethyl-4,4'-biphenylene diisocyanate, 3,3'-dimethoxy-4,4'-biphenylene diisocyanate, 3,3'-diphenyl-4,4'-biphenylene diisocyanate, 4,4'-biphenylene diisocyanate, 3,3'-dichloro-4,4'-biphenylene diisocyanate, p,p',p"-triphenylmethane triisocyanate, 1,5-naphthalene diisocyanate, furfurylidene diisocyanate or polyisocyanates in a blocked or inactive form such as the bis-phenyl carbamates of 2,4- or 2,6-toluylene diisocyanate, p,p'-diphenylmethane diisocyanate, p-phenylene diisocyanate, 1,5-naphthalene diisocyanate and the like. It is also possible to use mixtures of isocyanates.

Polyols suitable for use in the process according to the invention are e.g. ethylene glycol, propylene glycol, 1,4-butane diol, 1,3-pentane diol, glycerine, trimethylolpropane, pentaerythritol, ethylene diamine, propylene diamine, 1,4-butane diamine, 1,3-butane diamine, ethanol amine, butanol amine, bis-beta-hydroxy ethylene diamine, N.N.N',N'-tetrakis(2-hydroxy propyl) ethylene diamine, and the bis-beta-hydroxy ethyl ether of hydroguinone.

Suitable polyols are also polyester resins, generally prepared by the condensation of a polyhydric alcohol, such as glycerol, trimethylol ethane, sorbitol and ethylene glycol, with a polycarboxylic acid or anhydride, such as adipic, sebacic, maleic and succinic; polyether resins which are generally polyalkylene ether glycols and are usually prepared by the condensation of lower alkylene oxides with glycols, such as ethylene glycol, propylene glycol and sorbitol, and naturally occurring hydroxyl-bearing oils, such as castor oil.

The degree of cross-linking of the polyurethane foam can be varied according to the type of polyol selected, and rigid, semi-rigid or flexible foams can be prepared as desired, with polyols having hydroxyl numbers ranging from about 30 to about 70 usually being preferred for the preparation of flexible foams and those having hydroxyl numbers ranging from about 200 to about 700 usually being preferred for the preparation of more rigid foams.

Any of the conventional blowing agents for polyurethane foams can be used in the present invention. Thus, water, wich reacts with isocyanates to form carbon dioxide; low boiling liquids, such as trichloromonofluoromethane, di-chlorodifluoromethane and isobutylene; and combinations of water and a low boiling liquid may be used as a blowing agent.

It is usually preferred to add a surface-active emulsifying agent to the polyurethane reaction mixture to ensure complete dispersion of the various components during the relatively short mixing cycle and to serve as a foam stabilizing and cell size control agent. However, the presence of an emulsifying agent is not always essential to the preparation of accetable foams. The amount of emulsifying agent used can be varied considerably depending on the nature of the emulsifying agent, but amounts varying from about 0.1% to 2.0% by weight, based on the total weight of the foamable composition, are generally used.

Any of the well-known anionic, cationic, or nonionic surface-active emulsifying agents may be used in the present invention, such as sodium dioctyl sulfosuccinate, sorbitan monolaurate and polyethylene glycol ricinoleate. However, organo-silicone surfactants such as the copolymers of dimethylpoly-siloxane and polyalkylene ether, polydimethyl siloxanes and silicone-glycol copolymers are preferred.

In the process according to the invention the polyol component used contains 5 to 100% by weight of material obtained from softwood and at least partially capable of reacting in the forming reaction of polyurethane foam in a way comparable to a polyol.

Materials originating from wood and suitable for use in the process according to the invention and in a polyurethane prepared by the process include tall oil, which is a mixture of fatty acids and tall resin; oils obtained by dry distillation of wood or by pyrolysis and resins separated therefrom; resins obtained from resin gum, wood extract and stump extract. (A. Hase Kemia-Kemi No. 1-2, 1978, p. 5); mixtures thereof and derivatives thereof, such as hydroxylated derivates and alkylene oxide derivatives.

For the adjustment of the rate of the foaming reaction and for obtaining a desired degree of crosslinking, the amount of the catalyst system used in the foaming process according to the invention is 0.01 to 5% by weight, based on the entire reaction mixture. The catalyst system includes at least one typical polyurethane foaming catalyst, including stannous compounds, such as stannous oleate, stannous octoate and dibutyl tin laurate; amines such as triethylene diamine, dimethyl cyclohexyl amine, alkanol amines, N,N,N',N'-tetramethyl-1,3-butane diamine and N-methylmorpholine; mixtures of amines and organotins such as a mixture of a tertiary amine with stannous octoate; and reactive catalysts, such as n-butyl acid phosphate.

Furthermore, the catalyst system contains the trimerization catalyst of the polyisocyante, the amount of which catalyst is 5 to 95% by weight based on the total amount of the catalyst system. Suitable trimerization catalysts include, for example, strong bases catalyzing the trimerization reaction of the isocyante, particularly alkali acetates, such as potassium and calcium acetate, and alkali formates, such as sodium formate.

There also exist numerous other suitable trimerization catalysts. Suitable trimerization catalyst are listed in Table I according to the structural types.

TABLE I

| Type | General formula | Examples |
|---|---|---|
| Amine | $R^1R^2R^3N$, wherein $R^1$, $R^2$ and $R^3$ represent independently a straight-chain, branched or cyclic $C_{1-6}$ alkyl | N,N—dimethylformamide, 2,4,6-tris(N,N—dimethylaminomethyl)phenol, 1,3,5-tris[(N,N—dimethyl-3-amino)propyl]-s-hexahydrotriazene N—(2-hydroxyethyl)aziridine |
| Phosphine | $R_3P$, wherein R is alkyl | triethyl phosphine, tri-n-butyl phospine |
| Alcoholate | R—OMe | sodium methylaite |
| Metal oxide | $Me_xO_y$ | lithium oxide |
| Metal salts of carboxylic acids | RCOOMe, Me = K, Na; Ca, Fe, Li, Mg, Hg, Ni, Pd, Co, Zn, Cr, Al, Sn, V, Ti | potassium formate, potassium acetate, sodium formate, sodium acetate, potassium-2-ethyl-hexanoate, potassium octanoate, potassium propionate, sodium benzoate |
| Ammonium salts of carboxylic acids | | trimethyl-2-hydroxypropyl-ammonium carboxylate |
| Metal chelate | | |
| Hydride | | sodium borohydride |
| Acid | | oxalic acid |
| Organometallic compounds | R—Me Me = Zn, Si, Sn Pb<br>$R_2$—Me<br>$R_3$—Me— | |
| Combination catalysts | amine epoxide<br>amine alkylene carbonate or an amine-imide combination catalyst | |

Potassium and quaternary ammonium salts of carboxylic acids are used in conjunction with amines in order to cause the normally fast trimerization reaction and the slower urethane reaction to take place simultaneously. Amine catalysts include e.g. 2,4,6-tris(N,N-dimethylaminomethyl)phenol and 1,3,5-tris[(N,N-dimethyl-3-amino)propyl]-s-hexahydrotriazene, which were mentioned in Table I.

Other mixtures of the catalysts mentioned in Table I can also be used as a trimerization catalyst. For example, 2,4,6-tris-(dimethylaminomethyl)phenol and N-(2-hdroxyethyl)aziridine together influence synergistically the trimerization reaction as well as alkali metal carboxylates when used together with trimethyl-2-hydroxypropylammonium carboxylate.

In the process according to the invention it is also possible to add to the system to be foamed a suitable powder-like filler material or a mixture of filler materials, such as mineral powder, in order to stiffen the isocyanurate modified polyurethane foam to be prepared. This is especially advantageous when the component obtained from wood contains fatty acids or the like compounds with a softening effect. The amount of a mineral filler material typically ranges from 5 to 50 percent by weight based on the system to be foamed. One particularly advantageous filler material is aluminium hdyroxide, which does not only stiffen the material but also acts as a fire-resistive agent.

The following examples illustrate the invention in more detail.

EXAMPLE 1

A foam body was prepared of the following components:

| Component A | |
|---|---|
| Tall Resin | 25 g |
| Ethoxylated tall resin | 25 g |
| Polyether polyol | 50 g |
| Dimethylcyclohexylamine; as a catalyst | 1 g |
| Glycol solution of potassium acetate (concentration 30%); as a trimerization catalyst | 1 g |
| Water | 0.6 g |
| Silicone stabilizer | 1 g |

| -continued | |
|---|---|
| Freon R11; as a propellant | 25 g |
| Component A in total | 128.6 g |
| Component B | |
| 4,4'-diphenylmethane diisocyanate | 112.0 g |

The used tall resin was a resin separated from tall oil (tall oil resin), and the ethoxylated tall resin was an ethylene oxide derivative of the same resin.

Component A was prepared by dissolving the tall resin in the hot ethoxylated tall resin at 80° C. The polyether polyol was added to this mixture, and the mixture was allowed to cool to room temperature, whereafter the catalysts, water, stabilizer and propellant were added to the mixture.

A foam was prepared by mixing together Component A and Component B, and by pouring the mixture into a mould in which the mixture was allowed to foam freely. According to measurements, the resultant foam had the following properties: density 34 kg/m$^3$, thermal conductivity 0.0192 Wm$^{-1}$K$^{-1}$, compression strength 182 kPa in a direction of the rise of the foam and 181 kPa in a direction perpendicular to the direction of rise. No dimensional changes were observed in a frost test ($-30°$ C.). The fire resistance properties, too, were in the same range as those of polyurethane foam prepared from conventional raw materials.

EXAMPLE 2

| Component A: | |
|---|---|
| Tall resin | 12.5 g |
| Ethoxylated tall resin | 50.0 g |
| Polyether polyol | 50.0 g |
| Dimethylcyclohexylamine | 1.5 g |
| Glycol solution ( conc. 30%) of potassium acetate | 1.0 g |
| Silicone stabilizer | 1.5 g |
| Freon R11 (propellant) | 29.0 g |
| Water | 0.4 g |
| Component A in total | 145.9 g |
| Component B: | |
| 4,4'-diphenylmethane diisocyanate | 130.0 g |

A foam was prepared as described in Example 1 by first mixing together the ingredients of Component A and thereafter Component A and Component B together. The density of the resultant foam was 34 kg/m$^3$, thermal conductivity 0.0183 Wm$^{-1}$K$^{-1}$, and compression strength 182 kPa in the direction of the rise of the foam and 160 kPa in a direction perpendicular to the direction of rise. Good results were obtained from a frost test and a burning test.

EXAMPLE 3

| Component A | |
|---|---|
| Ethoxylated tall resin | 67 g |
| Polyether polyol | 33 g |
| Dimethylcyclohexylamine | 1 g |
| Glycol solution (conc. 30%) of potassium acetate | 1 g |
| Silicone stabilizer | 1 g |
| Water | 0.8 g |
| Freon R11 propellant | 35 g |
| Aluminium trihydroxy powder | 105 g |
| Dimethyl methane phosphonate (a fire resistive agent) | 2 g |
| Component A in total | 245.8 g |
| Component B | |
| 4,4'-diphenylmethane diisocyanate | 100 g |

A foam was prepared by first mixing together the ingredients of Component A, and thereafter Component A and Component B with each other. The resultant foam had a high heat insulation capacity (0.0185 Wm$^{-1}$K$^{-1}$) and a high resistance to frost as well as excellent fire resistance properties.

EXAMPLE 4

| Component A: | |
|---|---|
| Tall oil | 40 g |
| Polyether polyol | 60 g |
| Dimethylcyclohexylamine (as a catalyst) | 2 g |
| Dibutyl tin dilaurate (as a catalyst) | 0.02 g |
| Glycol solution (30%) of potassium acetate (as a catalyst) | 1 g |
| Silicone stabilizer | 1.5 g |
| Water | 0.5 g |
| Freon R11 propellant | 30 g |
| Component A in total | 135.02 g |
| Component B: | |
| 4,4'-diphenylmethane diisocyanate | 150 g |

A foam was prepared by first mixing the ingredients of Component A with each other and thereafter Component A and Component B with each other. The resultant foam had a high heat insulation capacity (0.0190 Wm$^{-1}$K$^{-1}$), sufficient mechanical and fire resistance properties as well as high resistance to frost.

All foams described in Example 1 to 4 above are espcially suitable to be used as heat insulators; they are self-extinguishing, i.e. they do not burn, if there are not fire maintaining materials present. Furthermore, they are more advantageous in manufacturing costs than foams prepared from conventional polyurethane raw materials.

EXAMPLE 5

| Component A: | |
|---|---|
| Ethoxylated tall resin | 60 g |
| Polyether polyol | 40 g |
| Dimethylcyclohexylamine } catalyst mixture | 0.7 g |
| Dibutyl tin dilaurate | 0.05 g |
| Glycol solution (conc. 20%) of sodium acetate as a trimerixation catalyst | 1.5 g |
| Silicone stabilizer | 1.0 g |
| Freon R11 as a propellant | 26 g |
| Component A in total | 129.25 g |
| Component B | |
| 4,4'-diphenylmethane diisocyanate | 108 g |

A foam was prepared by first mixing the ingredients of Component A with each other and thereafter Component A and Component B with each other. In the example, the amount of material originating from wood in the polyol is 60%. The resultant foam had high fire resistance properties, it was hard and tough and had a sufficient frost resistance. The thermal conductivity was 0.0183 Wm$^{-1}$K$^{-1}$.

EXAMPLE 6

The recipe differed from that of Example 3 only with respect to the trimerization catalyst, which now was a glycol solution (conc. 20%) of lithium acetate. The amount used in the recipe was 2 g. The properties of the resultant foam were corresponding to the properties of the foam of Example 3.

EXAMPLE 7

| Component A: | |
|---|---|
| Ethoxylated tall resin | 50 g |
| Poletber polyol | 50 g |
| Dimethylcyclohexylamine | 1.0 g |
| Glycol solution (conc. 20%) of potassium formate as a trimerization catalyst | 0.5 g |
| Silicone stabilizer | 1.0 g |
| Freon R11 as a propellant | 25 g |
| Component A in total | 127.5 g |
| Component B: | |
| 4,4'-diphenylmethane dissocyanate | 103 g |

A foam was prepared by first mixing the ingredients of Component A with each other and thereafter Component A and Component B with each other. In the example, the amount of material originating from wood in the polyol was 50%. The foam was hard and tough and had a good dimensional stability, thermal conductivity (0.0170 Wm$^{-1}$K$^{-1}$) as well as a sufficient frost resistance and fire resistance.

EXAMPLE 8

The recipe differed from that of Example 5 only with respect to the trimerization catalyst, which now was a glycol solution (concentration 20%) of potassium propionate. The amount used in the recipe was 0.7 g. The properties of the resultant foam were corresponding to the properties of the foam of Example 5.

EXAMPLE 9

| Component A: | |
|---|---|
| Gum resin | 10 g |
| Ethoxylated gum resin | 30 g |
| Polyether polyol | 60 g |
| Dimethylcyclohexylamine | 1.0 g |
| Glycol solution (conc. 40%) of | 0.5 g |

| | |
|---|---|
| potassium-2-ethylhexanoate as a trimerization catalyst | |
| Silicone stabilizer | 1.0 g |
| Freon R11 as a propellant | 30 g |
| Component A in total | 133 g |
| Component B: | |
| 4,4'-diphenylmethane dissocyanate | 122 g |

A foam was prepared by fist mixing the ingredients of Component A with each other, and thereafter Component A and Component B with each other. The resultant foam had a sufficient strength and a sufficient frost resistance as well as high thermal insulation and fire resistance properties.

EXAMPLE 10

| Component A: | |
|---|---|
| Ethoxylated tall resin | 50 g |
| Polyether polyol | 25 g |
| Polyester polyol | 25 g |
| Dimethylcyclohexylamine ⎫ catalyst mixture | 0.5 g |
| Dibutyl tin dilaurate ⎭ | 0.03 g |
| Trimethyl-2-hydroxypropylammonium carboxylate (Dabco TMR) as a trimerization catalyst | 1.1 g |
| Silicone stabilizer | 1.0 g |
| Freon R11 as a propellant | 28 g |
| Component A in total | 130.63 g |
| Component B: | |
| 4,4'-diphenylmethane dissocyanate | 125 g |

A foam was prepared by fist mixing the ingredients of Component A with each other, and thereafter Component A and Component B with each other. The foam was hard and tough and had a good dimensional stability, a sufficient frost resistance and good fire resistance and thermal insulation properties. In this example, the amount of material originating from wood was 50% of the amount of polyol.

EXAMPLE 11

The recipe differed from that of Example 8 only with respect to the trimerization catalyst, which now was a 1:1 mixture of 2,4,6,-tris-(dimethylaminomethyl)phenol and N-(2-hydroxyethyle)aziridine. The amount used was 0.8 g. The resultant foam had inferior fire resistance properties as compared with a foam prepared according to the recipe of Example 8.

EXAMPLE 12

| Component A: | |
|---|---|
| Ethoxylated wood extract resin | 40 g |
| Polyether polyol | 60 g |
| Dimethylcyclohexylamine | 0.8 g |
| 1,3,5-tris[(N,N—dimethyl-3-amino)propyl]-s-hexahydrotriazene as a trimerization catalyst | 0.9 g |
| Silicone stabilizer | 1.0 g |
| Freon R11 as a propellant | 32 g |
| Component A in total | 134.7 g |
| Component B: | |
| 4,4'-diphenylmethane dissocyanate | 132 g |

A foam prepared by fist mixing the ingredients of Component A with each other, and thereafter Component A and Component B with each other. In this example, the amount of material originating from wood was 40% of the amount of polyol. The resultant foam had sufficient mechanical, thermal insulation and fire resistance properties.

EXAMPLE 13

The recipe differed from that of Example 10 only with respect to the trimerization catalyst, which now was a 1:1 mixture of 2,4,6-tris(N,N-dimethylaminomethyl)phenol and potassium octanoate. The amount used was 0.6 g. The properties of the resultant foam were corresponding to the properties of the foam of Example 10.

EXAMPLE 14

| Component A: | |
|---|---|
| Wood extract resin | 15 g |
| Ethoxylated wood extract resin | 35 g |
| Polyether polyol | 50 g |
| Dimethylcyclohexylamine | 0.8 g |
| Glycol solution (conc. 30%) of potassium acetate | 0.25 g |
| Glycol solution (conc. 20%) of sodium acetate | 0.3 g |
| Silicone stabilizer | 1.0 g |
| Freon R11 | 30 g |
| Component A in total | 132.35 g |
| Component B: | |
| 4,4'-diphenylmethane diisocyanate | 128 g |

A foam was prepared by fist mixing the ingredients of Component A with each other (the wood extract resin was dissolved in the polyether polyol), and thereafter Component A and Component B with each other. In this example, the amount of material originating from wood was 50% based on the amount of polyol. The resultant foam had sufficient mechanical, thermal insulation and fire resistance properties.

We claim:

1. A process for the preparation of an isocyanurate modified polyurethane foam, characterized in that an organic polyisocyanate is reacted with a polyol in the presence of a catalyst system and a blowing agent, eventually in the presence of a material selected from the group consisting of a filler, an emulsifying agent and mixtures thereof, wherein said polyol contains 5 to 100% by weight of a material originating from soft wood selected from the group consisting of an oil, resin, mixture of resins, derivatives thereof and mixtures thereof and wherein said polyol contains in its molecular structures hydroxyl groups capable of reacting with isocyanate groups, and that the catalyst system comprises at least one polyurethane foaming catalyst and 5 to 95% by weight, based on the total amount of the catalyst system, of a trimerization catalyst of the polyisocyanate, said trimerization catalyst selected from the group consisting of an alkali metal carboxylate, 1,3,5-tris((N,N-dimethyl-3-amino)propyl)-s-hexahydrotriazene, N-(2-hydroxyethyl)-aziridine and 2,4,6-tris-(dimethylaminomethyl)phenol, which trimerization catalyst causes cross-linked polyisocyanurate structures containing isocyanurate rings to be formed from the polyisocyanate in the polymer structure.

2. A process according to claim 1, characterized in that the polyol contains 5 to 100% by weight of tall resin.

3. A process according to claim 1, characterized in that the polyol contains 5 to 100% by weight of wood extract resin.

4. A process according to claim 1, characterized in that the polyol contains 5 to 100% by weight of gum resin.

5. A process according to claim 1, characterized in that the polyol contains 5 to 100% by weight of a mixture of resins.

6. A process according to claim 1, characterized in that the polyol contains a derivative of a resin originating from wood.

7. A process according to claim 1, characterized in that the trimerization catalyst is an alkali metal carboxylate.

8. A process according to any one of claims 1 to 7, characterized in that a powder-like mineral filler material is added to the mixture to be foamed or to one component of said mixture.

9. A process according to claim 1, characterized in that the filler material is aluminum hydroxide.

10. An isocyanurate modified polyurethane foam prepared by the process according to claim 1, characterized in that it is formed of the reaction product of an organic polyisocyanate and a polyol, the reaction product being crosslinked by said catalyst system containing said trimerization catalyst of the polyisocyanate, and eventually of a filler material, wherein said polyol contains 5 to 100% by weight of an organic material originating from wood.

11. A process according to claim 7, characterized in that the trimerization catalyst is an alkali metal carboxylate selected from the group consisting of an alkali metal acetate and an alkali metal formate.

12. A process according to claim 1, characterized in that the said at least one polyurethane foaming catalyst is selected from the group consisting of stannous compounds, amines, alkanol amines, mixtures of said stannous compounds and said amines and reactive catalysts.

13. A process according to claim 12, characterized in that said polyurethane foaming catalyst is selected from the group consisting of stannous oleate, stannous octoate, dibutyl tin laurate, triethylene diamine, dimethyl cyclohexyl amine, N,N,N',N'-tetramethyl-1,3-butane diamine, N-methylmorpholine and n-butyl acid phosphate.

14. A process according to claim 12 wherein said trimerization catalyst is an alkyl metal carboxylate.

15. A process according to claim 13 wherein said trimerization catalyst is an alkyl metal carboxylate.

* * * * *

UNITED STATES PATENT AND TRADEMARK OFFICE
CERTIFICATE OF CORRECTION

PATENT NO. : 4,829,097

DATED : May 9, 1989

INVENTOR(S) : Tormala et al.

It is certified that error appears in the above-identified patent and that said Letters Patent is hereby corrected as shown below:

Column 1, line 49    "formed" should be --foamed--;

Column 3, line 5     delete "and";

Column 3, line 21    "radical" should be --radicals--;

Column 4, line 1     "wich" should be --which--;

Column 5, line 36    "hdroxyethyl" should be --hydroxyethyl--;

Column 7, line 59    "espcially" should be --especially-; and,

Column 11, line 17   "1" should be --8--.

Signed and Sealed this

Twenty-third Day of January, 1990

Attest:

JEFFREY M. SAMUELS

Attesting Officer    Acting Commissioner of Patents and Trademarks